United States Patent
Zabala Zabaleta et al.

(10) Patent No.: US 12,406,542 B2
(45) Date of Patent: Sep. 2, 2025

(54) ACCESS CONTROL SYSTEM

(71) Applicant: OJMAR, S.A., Elgoibar (ES)

(72) Inventors: Jon Zabala Zabaleta, Elgoibar (ES); Jokin Aguirrezabala Olasagasti, Elgoibar (ES); Mikel Solozabal Ibarra, Elgoibar (ES)

(73) Assignee: OJMAR, S.A., Elgoibar (ES)

( * ) Notice: Subject to any disclaimer, the term of this patent is extended or adjusted under 35 U.S.C. 154(b) by 101 days.

(21) Appl. No.: 18/102,386

(22) Filed: Jan. 27, 2023

(65) Prior Publication Data
US 2023/0245515 A1 Aug. 3, 2023

(30) Foreign Application Priority Data
Jan. 28, 2022 (ES) .................. P202230066

(51) Int. Cl.
*G07C 9/20* (2020.01)
*G06F 8/65* (2018.01)

(52) U.S. Cl.
CPC .................. *G07C 9/20* (2020.01); *G06F 8/65* (2013.01)

(58) Field of Classification Search
CPC .................. G07C 6/20; G07C 9/00896; G07C 2009/00634; G06F 8/65; E05B 47/06; E05B 2047/0062; E05B 1/0038; E05B 47/0763
See application file for complete search history.

(56) References Cited

U.S. PATENT DOCUMENTS

| | | |
|---|---|---|
| 4,843,300 A | 6/1989 | Alderman |
| 4,985,670 A | 1/1991 | Kaneyuki et al. |
| 5,994,789 A | 11/1999 | Ochiai |
| 6,384,551 B1 | 5/2002 | Watanabe |

(Continued)

FOREIGN PATENT DOCUMENTS

| | | |
|---|---|---|
| DE | 20114838 | 12/2001 |
| DE | 20114838 U1 | 12/2001 |

(Continued)

OTHER PUBLICATIONS

Preliminary Amendment dated Oct. 11, 2023 in U.S. Appl. No. 18/085,981.

(Continued)

*Primary Examiner* — Vernal U Brown
(74) *Attorney, Agent, or Firm* — Pearl Cohen Zedek Latzer Baratz LLP

(57) ABSTRACT

An access control system includes a control circuit (7), a push button (4) that can be moved from a distal position to a proximal position, aided by an elastic element (4.d) to keep it in the distal open position, a tab (3), configured to be moved by means of the push button (4), and establish the closure of the access, a locking device (5) for locking the closed position of the tab (3), an access identification element that communicates with the control circuit (7) that locks the closed position of the tab (3) when the control circuit (7) identifies the access element, characterized by comprising a rotating element that rotates when the push button (4) is actuated, a clutch mechanism (6.c) that transmits the rotating movement of the rotating element to a power-generating motor (6.a) to power the control circuit (7) when the push button (4) is actuated, avoiding the use of battery.

33 Claims, 10 Drawing Sheets

(56) References Cited

U.S. PATENT DOCUMENTS

| | | | |
|---|---|---|---|
| 6,527,310 B1* | 3/2003 | Bellamy | E05B 47/0607 |
| | | | 292/144 |
| 6,747,425 B2 | 6/2004 | Marshall, III et al. | |
| 6,792,341 B2 | 9/2004 | Hunt et al. | |
| 6,813,917 B2* | 11/2004 | Miller | E05B 65/0075 |
| | | | 292/144 |
| 7,030,511 B2 | 4/2006 | Zarei | |
| 7,224,146 B2 | 5/2007 | Poore et al. | |
| 7,540,176 B2 | 6/2009 | Arriola Arrizabalaga et al. | |
| 7,768,244 B2 | 8/2010 | Perol | |
| 7,886,857 B2 | 2/2011 | Fujitake | |
| 8,040,092 B2 | 10/2011 | Peterson | |
| 8,253,400 B2 | 8/2012 | Irissou et al. | |
| 8,760,080 B2 | 6/2014 | Yu | |
| 9,024,533 B2 | 5/2015 | Gossehelweg et al. | |
| 9,093,894 B2 | 7/2015 | Liu | |
| 9,172,314 B2 | 10/2015 | Koyama | |
| 9,581,635 B2 | 2/2017 | Moga | |
| 9,718,366 B2 | 8/2017 | Matsuda | |
| 9,755,456 B1 | 9/2017 | Peterson et al. | |
| 9,815,375 B2 | 11/2017 | Matsuda | |
| 10,017,058 B2 | 7/2018 | Nomura | |
| 10,179,512 B2 | 1/2019 | Matsuda | |
| 11,167,704 B2 | 11/2021 | Nunokawa | |
| 11,292,346 B2 | 4/2022 | Duan et al. | |
| 11,545,728 B2 | 1/2023 | Yang et al. | |
| 11,699,390 B2 | 7/2023 | Hendrix | |
| 11,745,614 B2 | 9/2023 | O'Connor et al. | |
| 12,304,344 B2 | 5/2025 | Tachibana | |
| 2002/0047686 A1 | 4/2002 | Kodama et al. | |
| 2003/0137261 A1 | 7/2003 | Marshall, III et al. | |
| 2003/0191576 A1 | 10/2003 | Zarei | |
| 2004/0083039 A1 | 4/2004 | Hunt et al. | |
| 2004/0095667 A1 | 5/2004 | Jain et al. | |
| 2007/0247115 A1 | 10/2007 | Ishikawa et al. | |
| 2008/0011528 A1 | 1/2008 | Verbrugge et al. | |
| 2008/0247201 A1 | 10/2008 | Perol | |
| 2009/0033100 A1 | 2/2009 | Dai | |
| 2010/0033146 A1 | 2/2010 | Irissou et al. | |
| 2010/0127650 A1 | 5/2010 | Peterson | |
| 2010/0212381 A1* | 8/2010 | Huang | E05B 47/068 |
| | | | 70/279.1 |
| 2013/0009568 A1 | 1/2013 | Yu | |
| 2013/0335193 A1* | 12/2013 | Hanson | G07C 9/00174 |
| | | | 340/5.61 |
| 2014/0167728 A1 | 6/2014 | Liu | |
| 2014/0312685 A1 | 10/2014 | Moga | |
| 2015/0021985 A1 | 1/2015 | Matsuda | |
| 2015/0042160 A1 | 2/2015 | Matsuda | |
| 2016/0250928 A1 | 9/2016 | Matsuda | |
| 2017/0274782 A1 | 9/2017 | Nomura | |
| 2019/0249723 A1* | 8/2019 | Lu | F16D 21/06 |
| 2020/0141157 A1* | 5/2020 | Miller | H02K 11/0094 |
| 2020/0298776 A1 | 9/2020 | Nunokawa | |
| 2020/0349786 A1* | 11/2020 | Ho | G06V 40/172 |
| 2021/0221238 A1 | 7/2021 | Duan et al. | |
| 2023/0066436 A1 | 3/2023 | Rutkowski | |
| 2023/0078180 A1 | 3/2023 | Hendrix | |
| 2023/0400870 A1 | 12/2023 | Nam | |
| 2025/0135926 A1 | 5/2025 | Ammanamanchi et al. | |

FOREIGN PATENT DOCUMENTS

| | | |
|---|---|---|
| ES | 2331500 A1 | 1/2007 |
| ES | 2331500 | 1/2010 |

OTHER PUBLICATIONS

Notice of Allowance dated Apr. 30, 2024 in U.S. Appl. No. 18/085,981.

Response to International Search Report and Written Opinion dated Nov. 24, 2023 in International Patent Application No. PCT/ES2023/070035.

International Search Report and Written Opinion, with English language translation of Written Opinion, in International Patent Application No. PCT/ES2023/070035.

English language translation of Abstract for ES2331500 published Jan. 5, 2010.

English language translation of Abstract for DE20114838 published Dec. 13, 2001.

Response to Office Action dated Oct. 26, 2023 in Patent Application No. P202230066, with machine translation thereof.

Office Action dated May 28, 2025 in U.S. Appl. No. 18/816,901.

* cited by examiner

ACCESS CONTROL SYSTEM

CROSS-REFERENCE TO RELATED APPLICATION

This application claims priority to Spanish Patent Application No. P202230066 filed Jan. 28, 2022, the disclosure of which is hereby incorporated by reference in its entirety.

BACKGROUND

Field of the Invention

The present technology relates to an access control system, the configuration and design of which allows its operation without the need to use batteries.

The present technology is applicable to any access system that is opened/closed by means of the manual actuation by a user and by means of the simultaneous use of an access identification element ("key"), such as the case of access to ticket offices.

Description of Related Art

Currently, non-wired mechatronic access control systems comprise a manually actuated lock, which further requires the simultaneous use of an access identification element to open/close a lock. These systems need battery power for their electronics and lock actuators (motor/solenoid) to work.

This fact causes the following problems:

- It is necessary to change the batteries when they drain, incurring a cost derived from the time required to change the batteries of each lock, as well as the added cost represented by the use of new batteries.
- They produce an environmental impact, since the components used in the manufacture of batteries are toxic (mercury, zinc, cadmium, nickel, lead, etc.), both for the environment and for health.
- Discarded batteries must be recycled and processed in facilities expressly dedicated to this, which also represents an additional cost.

Spanish patent document with application number P200702794 describes a programmable electronic lock, governed by a control circuit and equipped with a manually actuated knob. The knob, can be moved by overcoming the action of a spring, in such a way that its movement causes the advancement of a tab to establish the closing of the lock. The closed position of the lock is maintained by means of a locking device for locking the push button in the closed position. Opening and closing of the lock is conditioned upon the verification of an access identification element (key) by means of the control circuit, by bringing said identification element close to the knob, so that when the identification element has not been validated, the control circuit does not activate the locking device, returning the knob to its initial position by the action of the spring. To open the lock, the access identification element must be validated, which unlocks the closed position of the knob, the lock being opened by the action of said spring aiding the knob. However, this lock presents the problem indicated above, that is, the need for a battery to be able to activate the different electronic and mechanical elements of the lock.

SUMMARY OF THE INVENTION

Embodiments of the present technology relate to an access control system including a push button that can be moved from a distal position to a proximal position, which is aided by an elastic element, for example a push button spring, to keep it in the distal position.

In addition, the system is equipped with a tab, configured to be moved by means of the push button, in such a way that it allows establishing the closure of the access system.

Another component of the system is a locking device for locking the closed position of the tab, and an access identification element that communicates with a control circuit to lock/unlock the closed position of the tab when the control circuit validates the access element.

In accordance with aspects of the present technology, the access control system comprises a power-generating system which is equipped with a rotating element, a clutch mechanism and a power-generating motor, so that the rotating element is connected to the power-generating motor through the clutch mechanism, which is configured to transmit the rotating movement of the rotating element to the power-generating motor when the push button is actuated from the distal to the proximal position, the power-generating system powering the control circuit during this movement.

The described configuration has the great advantage that it does not require the use of batteries to power the control circuit, so that all the problems described in the Background section are avoided.

In embodiments of the present technology, the locking of the tab in the closed position is carried out by means of a locking shaft, provided in the locking device, which is inserted into a housing provided in the tab, when the push button has been pressed and the access identification element has been validated.

If the access identification element is not validated, the tab is not locked in the closed position and returns to its initial open position.

The push button is intended to be equipped with ramp guides that are arranged on tab shafts, in such a way that the guided movement of the tab is possible when the push button is actuated.

The return of the push button to the distal position is produced by the action of the push button spring, when the push button is no longer actuated, so whenever the push button is not being pressed, it remains in its distal position regardless of whether the access is closed or open.

Once the tab is locked in the closed position, to open it, the push button must be pressed again, generating again the power that powers the control circuit so that the access element may be validated.

If the access identification element is valid, the locking shaft is withdrawn, releasing the tab, so that the access is opened.

If the access identification element is not valid, the tab remains locked in the closed position, so that the access remains closed.

This configuration determines that whenever the push button is pressed, the motor generates power, either to open or close the access.

The tab is aided by a tab return spring that keeps it in the open position and opposes its movement to the closed position, so that when the push button is pressed to close the access, the force of action of the tab return spring must be overcome. This structure determines that the tab moves to the open position once it has been unlocked.

In one embodiment, the clutch mechanism comprises a body, which is integral with the rotating element, and in which there is retained in an articulated manner at least one ratchet arm that rests, by the action of a pushing element, on ratchet teeth provided on the inner contour of a ratchet disc which is coupled to the shaft of the motor to allow rotation of the motor when the push button is actuated from its distal position to its proximal position and to prevent its rotation when the push button returns to the distal position.

In another embodiment, the clutch mechanism is simplified, with the body also being integral with the rotating element, but in this case it has been configured to retain a pushing element equipped with at least one flexible arm that rests on the ratchet teeth on the inner contour of the ratchet disc, which is coupled to the shaft of the power-generating motor to, as in the previous case, allow rotation of the motor when the push button is actuated from its distal position to its proximal position and to prevent its rotation when the push button returns to the distal position.

In another simplified embodiment, the body of the previous embodiments is eliminated, for which purpose the pushing element, equipped with at least one flexible arm, is arranged directly integral with the rotating element, so that said flexible arm also rests on the ratchet teeth on the inner contour of the ratchet disc to carry out the mentioned functionality consisting of allowing rotation of the motor when the push button is actuated from its distal position to its proximal position and avoiding its rotation when the push button returns to the distal position.

The rotating element may be a pinion that meshes with a rack provided in the push button, which facilitates its angular movement when the push button is pressed.

The electrical power generator produces more power than the control circuit consumes, both to close and open the access system, which allows the control circuit to be configured to perform actions of another type, such as saving the events occurring, together with the closed or open access status, in a memory; activating a sound device; and/or activating a light device. The sound and light devices are activated to signal to the user the different actions that are carried out in the system.

In the case of a system failure, it is foreseen that it can include an emergency manual opening mechanism for the locked tab position. To this end, this mechanism is equipped with a lever the actuation of which causes the movement of the locking shaft provided in the locking device, coming out of the housing of the tab, which determines that the tab moves to the open position by the action of its return spring.

The emergency manual opening mechanism may be arranged inside the push button, so it has been configured to be able to break it at its upper part, and allow access to said emergency manual opening mechanism, causing the movement of the lever that contacts a stop provided on the locking shaft when the emergency opening is performed.

It has been foreseen that it is possible to carry out maintenance tasks in the system, such as updating its firmware, reading all the events occurring, etc., which are functions that may require more power than what the electrical power generator produces, so the control circuit has been equipped with an external power supply device by means of contacts. With the external power supply connected, a maintenance device can be used to carry out the event reading tasks, configuration and firmware updates and that further allows a power supply to be provided to the control circuit in the event that an emergency opening is required.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

To complete the description and for the purpose of aiding to better understand the features of the present technology, a set of figures is attached to the present specification as an integral part thereof, in which the following is depicted in an illustrative and nonlimiting manner.

DETAILED DESCRIPTION OF THE INVENTION

Figure 1:
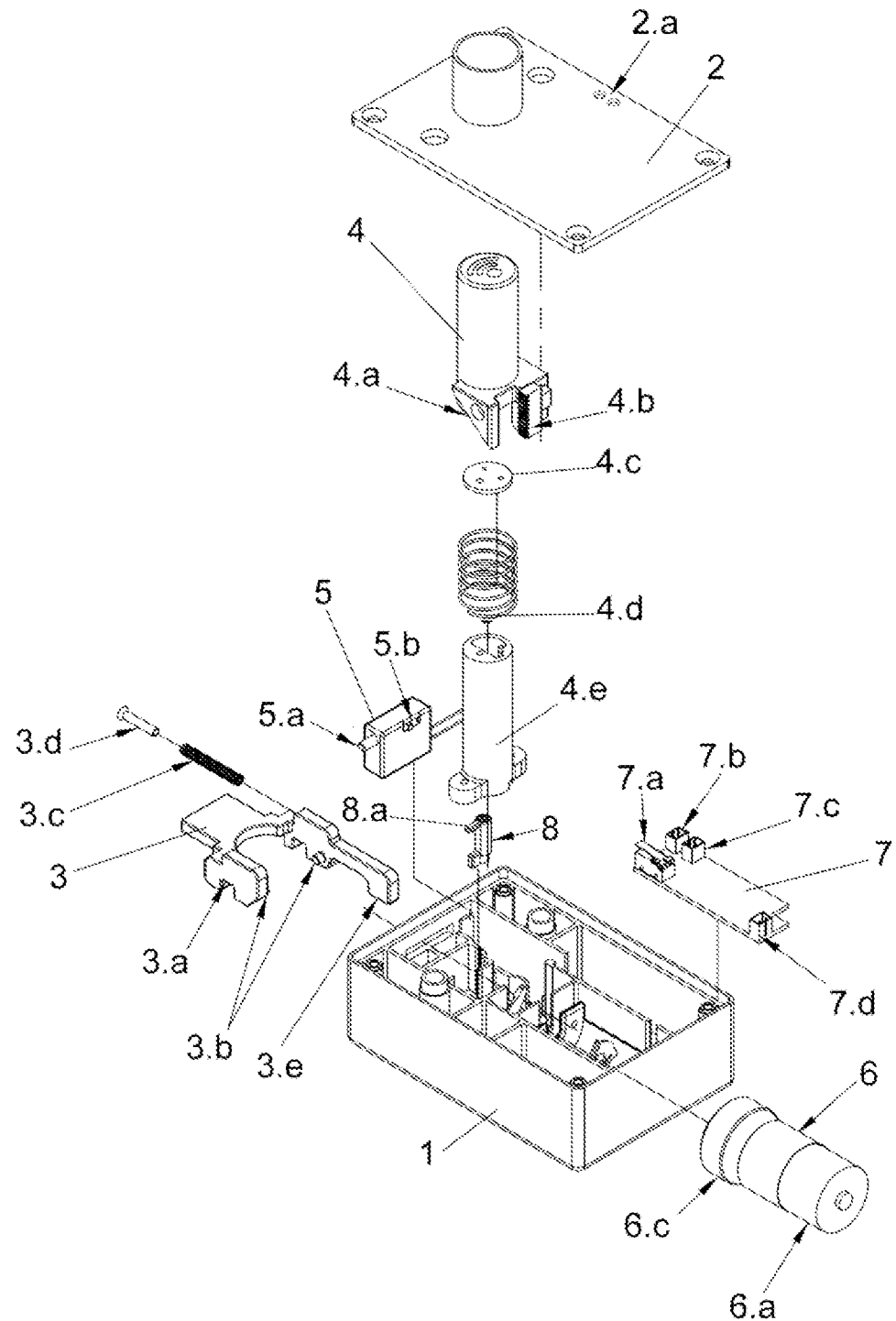
FIG. 1 shows an exploded view of an exemplary embodiment of the access system according to an embodiment of the present technology.
Figure 2:
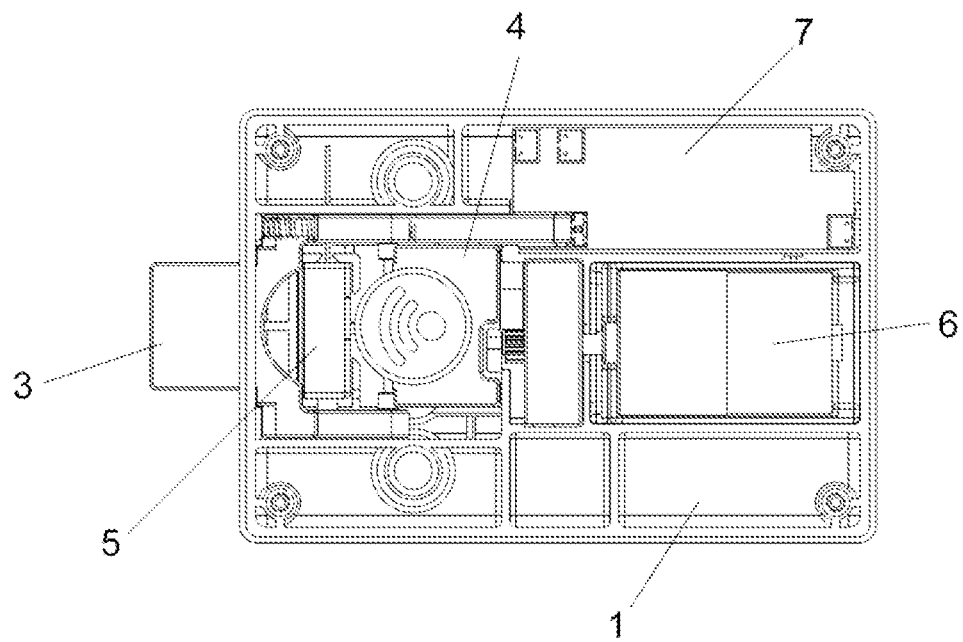
FIG. 2 shows a view of the arrangement of the elements of the system with all the elements assembled and without the cover.

The configuration and design of the access control system of the present technology allow its operation without the need to use power supply batteries for the control circuit that the system includes, thus solving the existing problems of the state of the art.

To this end, the necessary power required to power the control circuit is obtained by means of transforming mechanical energy, which must be applied by the user when acting on the system, into electrical power, since to open or close the system, the user has to apply a movement to same.

The transformation of mechanical energy into electrical energy is achieved thanks to the use of an electrical power generator (6), which comprises a power generating motor (6.a) that is not described in greater detail because it is not the object of the present technology.

The power produced is not stored, as is done in other power generation systems, but rather is used instantly from the start of its production, applying the method described in patent application P202131190, which patent application is incorporated by reference herein it is entirety.

A force F is applied on the push button (4), which causes its rectilinear movement from a distal position to a proximal position, which, in turn, establishes the movement of the tab (3) by the action of the pushing carried out by ramp guides (4.a), located on both sides of the body of the push button (4), on tab shafts (3.b). This configuration keeps the tab (3) attached to the push button (4) during pressing, while at the same time allowing the tab (3) to move transversely in relation to the pressing movement carried out on the push button (4).

Figure 3:
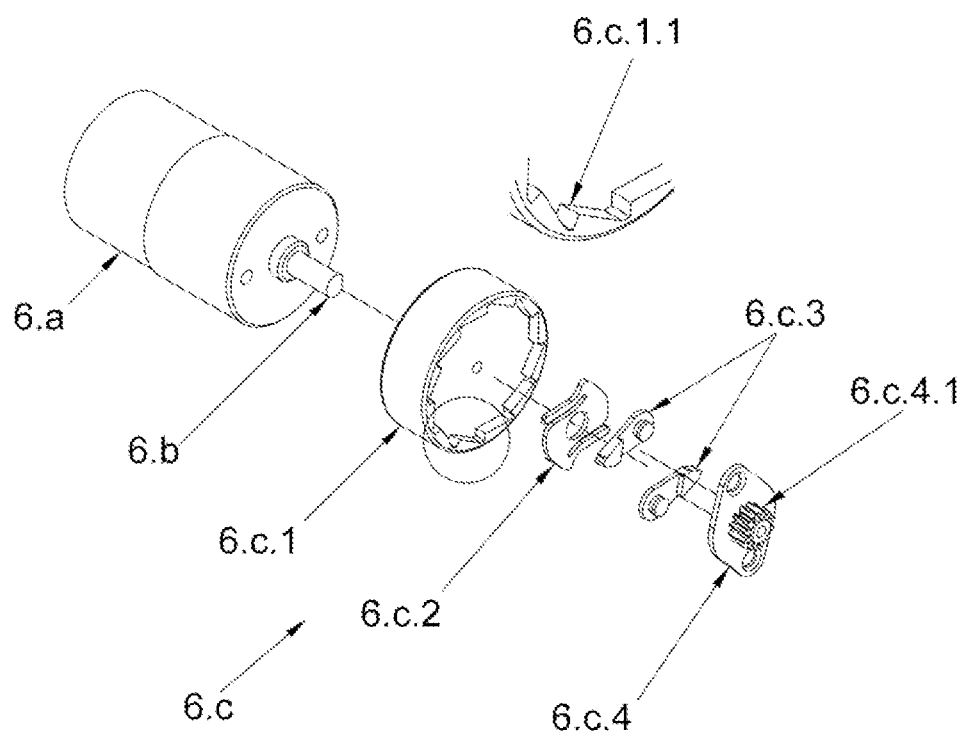
FIG. 3 shows an exploded view of the configuration of the clutch mechanism and its connection to the power-generating motor.

When the push button (4) is pressed, the rectilinear movement of the push button (4) is transformed into a circular movement of a rotating element, which is made up of a pinion (6.c.4.1, FIG. 3) that is part of the power generator (6) and meshes with a rack (4.b) that is part of the push button (4). The pinion (6.c.4.1) is integral with a body (6.c.4), which means that when the pinion (6.c.4.1) rotates, said body (6.c.4) also rotates.

In turn, in the body (6.c.4) there are retained, with the possibility of rotation, ratchet arms (6.c.3), which, by the action of a pushing element (6.c.2), rest on ratchet teeth (6.c.1.1), provided on the inner contour of a ratchet disc (6.c.1), which is coupled to the shaft (6.b) of the generating motor (6.a), this assembly forming a clutch mechanism (6.c) of the electrical power generator (6) that transmits the circular movement to the generating motor (6.a) when the push button (4) is pressed.

The generating motor (6.a) is equipped with a multiplier gearbox, as is known in the state of the art to provide a higher electrical power production.

In addition, the generating motor (6.a) is connected to a control circuit (7) to provide an electrical power supply to same when it rotates.

The ratchet arms (6.c.3) only mesh with the ratchet teeth (6.c.1.1) during the pressing movement of the push button (4), for which said teeth (6.c.1.1) have a sawtooth configuration.

Figure 9:
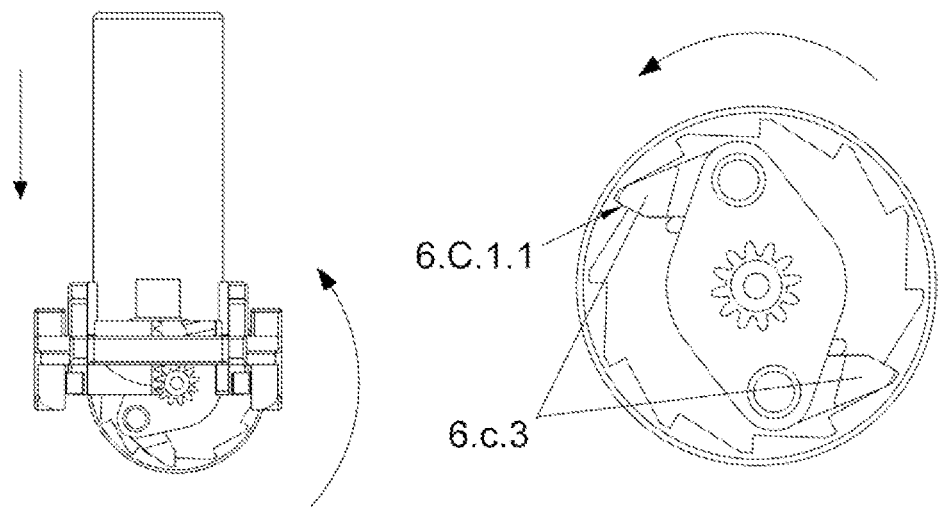
FIG. 9 shows a detail of the arrangement of the ratchet arms of the clutch mechanism in FIG. 3, when the push button is lowered, in which position said arms engage the ratchet teeth to rotate the power generator.

FIG. 9 shows how the ratchet arms (6.c.3) engage the ratchet teeth (6.c.1.1), thus achieving the rotation of the disc (6.c.1).

The push button (4) is provided with a guide (4.e) on which it is arranged and is aided by an elastic element (4d), for example a push button spring that causes the movement opposite to the pressing movement to recover its initial position when it is no longer pressed, which determines that the rack (4.b) rotates the body (6.c.4) in the direction opposite the pressing direction, in which situation the arms (6.c.3) do not engage the ratchet teeth (6.c.1.1) due to their sawtooth configuration, causing the ratchet disc (6.c.1) not to rotate, therefore no power is generated during this movement.

Figure 10:
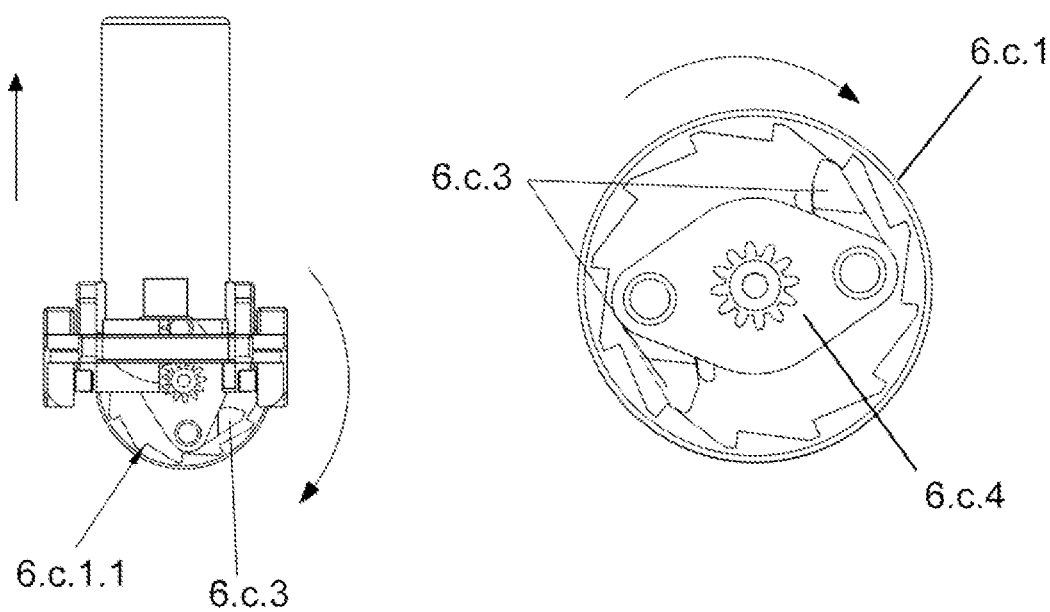
FIG. 10 shows a detail of the arrangement of the ratchet arms of the clutch mechanism in FIG. 3, when the push button is raised, in which position said arms do not engage the ratchet teeth, which prevents rotation of the power generator.

In FIG. 10, it can be seen how the ratchet arms (6.c.3) do not engage the ratchet teeth (6.c.1.1), and therefore do not exert any pushing on them, so the ratchet disc (6.c.1) does not rotate (the rotation arrow refers to the rotation of the body (6.c.4) and therefore of the ratchet arms (6.c.3), but the disc (6.c.1) does not move.

The operation of the motor (6.a) is not the usual operation of a motor, that is, an electric current is applied to the motors so that the output shaft rotates at certain revolutions, in this case, the reverse operation is caused, that is, the shaft (6.b) of the motor is rotated mechanically at certain revolutions in order to generate a current and obtain a quantity of electrical power output sufficient to power the control electronics.

In addition, to open or close the system, it is necessary to use an access identification element (not depicted) carrying out key functions, which must be located close to the system, for which the push button (4) is equipped with an antenna (4.c) through which it communicates with the control circuit (7). In the event of a non-valid/valid reading of the key, the mechatronics is responsible for locking/unlocking the movement of the tab (3), which makes it possible to considerably reduce the power required by the system.

When the user presses the push button (4), the control circuit (7) detects that power is being generated and begins the key authentication process.

Figure 4:
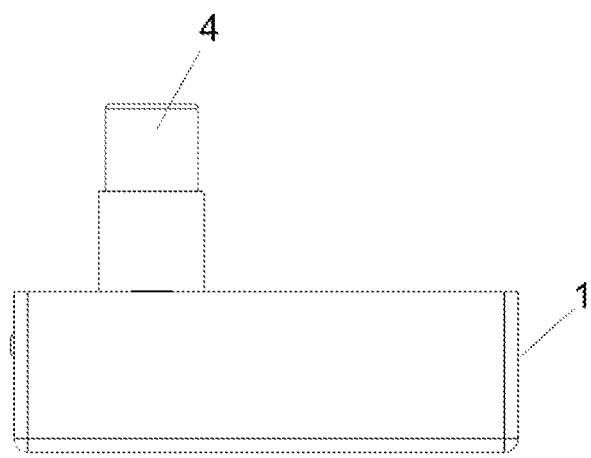
FIG. 4 shows a view of the system in the open position, in which the push button is in its highest, distal position, and the tab hidden in the casing.

Actuation of push button (4) moves the tab (3) into and out of the casing (1) as explained below. The tab (3) may have a variety of shapes and sizes such that at least a portion of the tab (3) physically protrudes from the casing (1) when in a closed position. The tab (3) is aided by a tab return spring (3.c), arranged on a tab return spring guide (3.d), which biases it in the open position, that is inside the casing (1), so if the access control system is initially in the open position (that is, the system is open, as shown in FIG. 4) when the push button (4) is pressed the tab (3) comes out of the casing (1), and if the authentication is correct, the tab (3) is locked in the closed position, outside the casing (1), and if the authentication is not correct, the tab (3) is not locked, being inserted again into the casing (1), by the action of the spring (3.c) when the push button (4) is no longer pressed.

Figure 5:
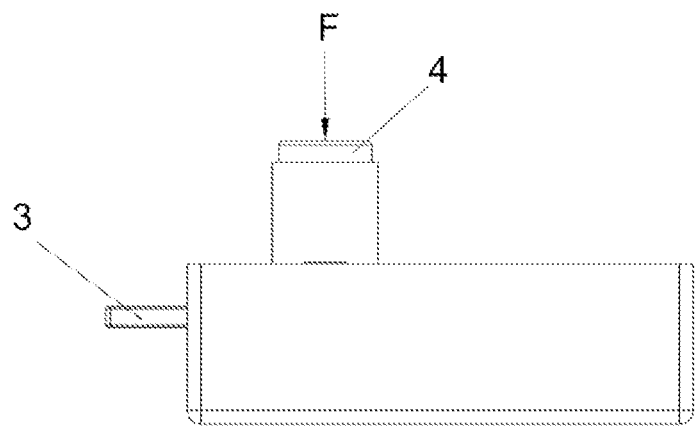
FIG. 5 shows a view of the system in the position in which the push button is pressed, when a force "F" is exerted, in which position said push button is in its lowest, proximal position, and the tab is protruding from the casing.
Figure 6:
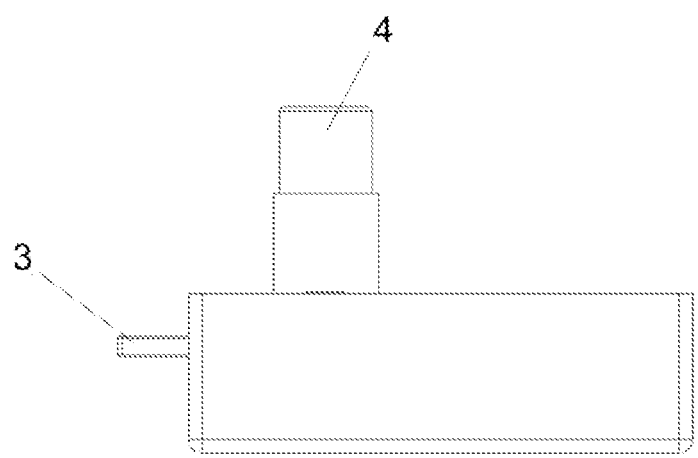
FIG. 6 shows a view of the system in the closed position, in which the push button is in its highest position and the tab is protruding from the casing and is locked by the locking shaft.
Figure 7:
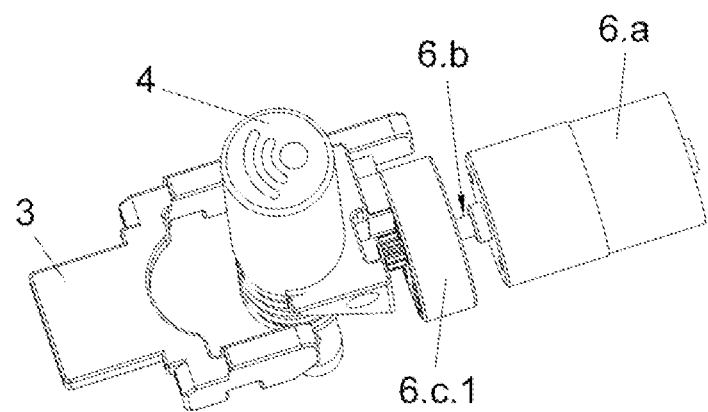
FIG. 7 shows a top perspective view in which the clutch of FIG. 3, the power-generating motor, the tab and the push button have been depicted.
Figure 8:
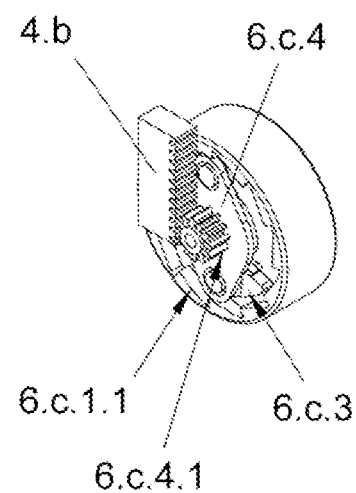
FIG. 8 shows a perspective view of the detail of the arrangement of the pinion of the clutch of FIG. 3 in the rack of the push button.

When the access control system is initially in the closed position (that is, the system is closed and the tab (3) is located outside the casing (1) and locked, as shown in FIG. 5) and the push button (4) is pressed, the control circuit (7) is powered and if the authentication is correct, the tab (3) is unlocked and by action of the tab return spring (3.c) returns to its open position. On the other hand, if the authentication is not correct, the tab (3) remains locked in its closed position.

The system comprises a locking device (5), also referred to herein as a lock (5), that is equipped with a locking shaft (5.a) for locking the position of the tab (3) in the closed position. The locking device (5) is governed by the control circuit (7), so that to lock the tab (3), said shaft (5.a) is 15 actuated to be inserted into a housing (3.a) provided on the tab (3). The shaft (5.a) of lock (5) is actuated by the control circuit (7). As explained, the control circuit (7) is powered by the generating motor (6.a) upon actuation of the push button (4).

To unlock the tab (3), the locking shaft (5.a) is withdrawn, so that it comes out of the housing (3.a) of the tab (3). At that moment, due to the action of the tab return spring (3.c), the tab (3) moves back until it is inserted into the casing (1).

Figure 11:
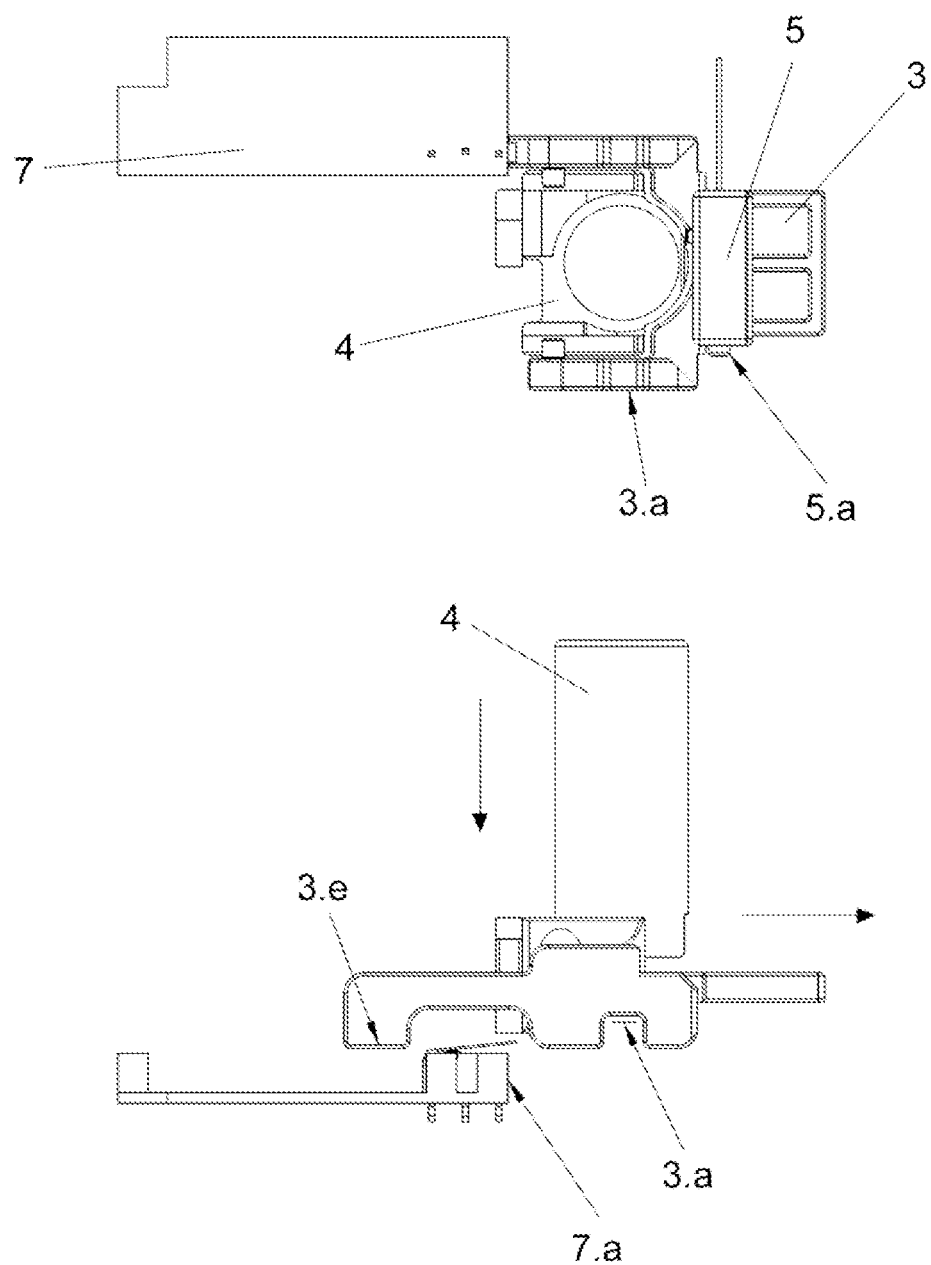
FIGS. 11 and 12 show the relative position of the tab in relation to the control circuit, in the open and closed positions, respectively, which positions are detected by said control circuit through a sensor.
Figure 12:
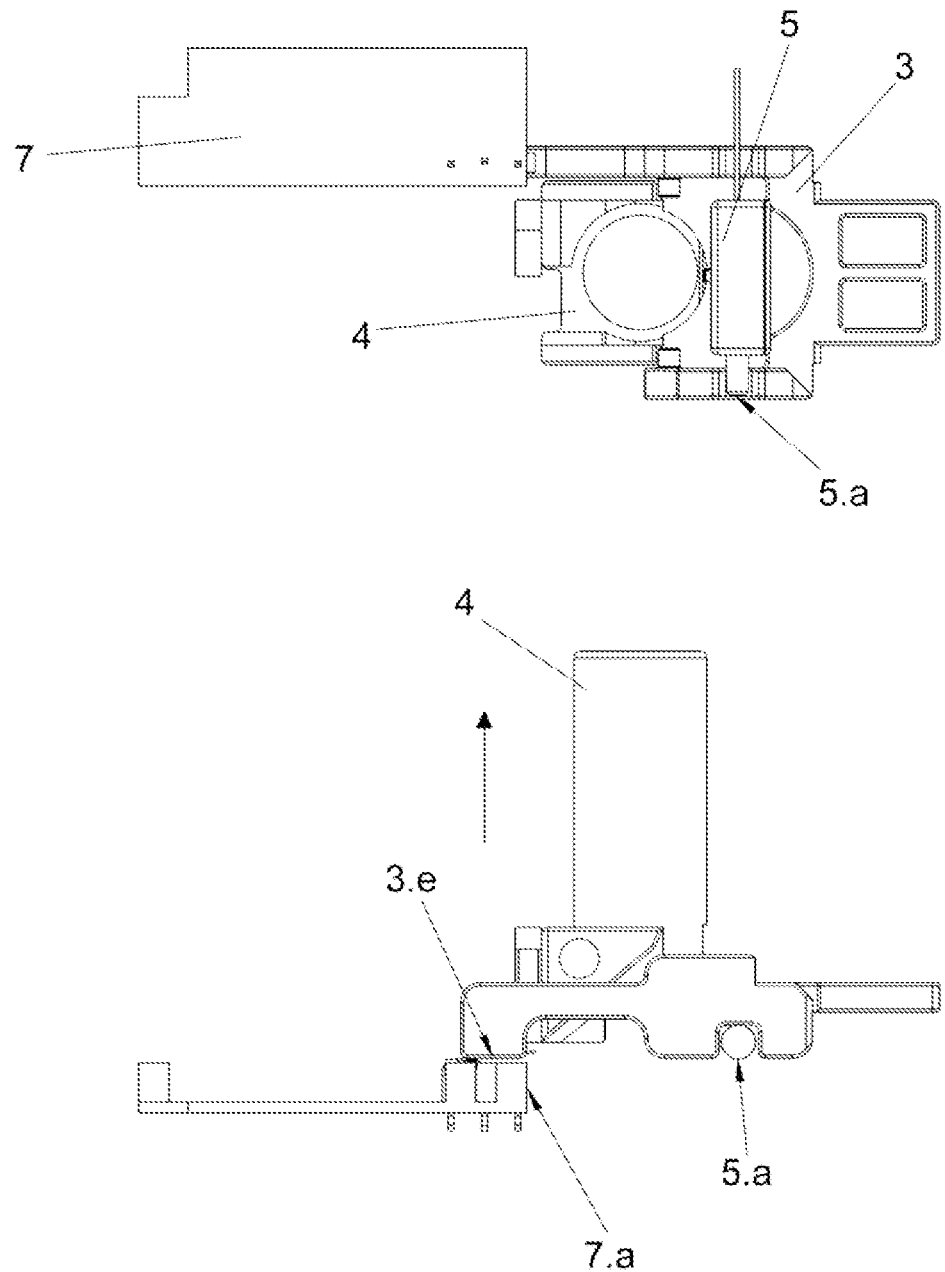
Figure 13:
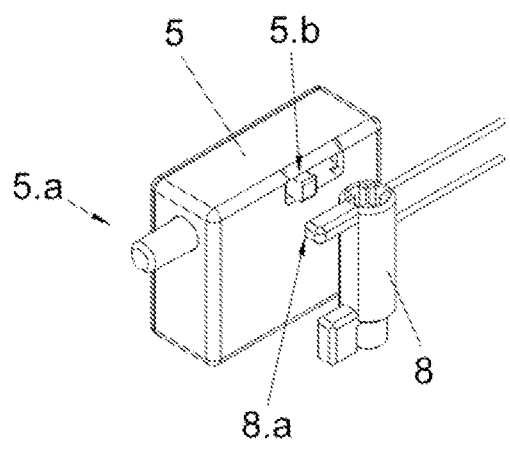
FIGS. 13 to 15 show the actuation sequence of the emergency manual opening mechanism.
Figure 14:
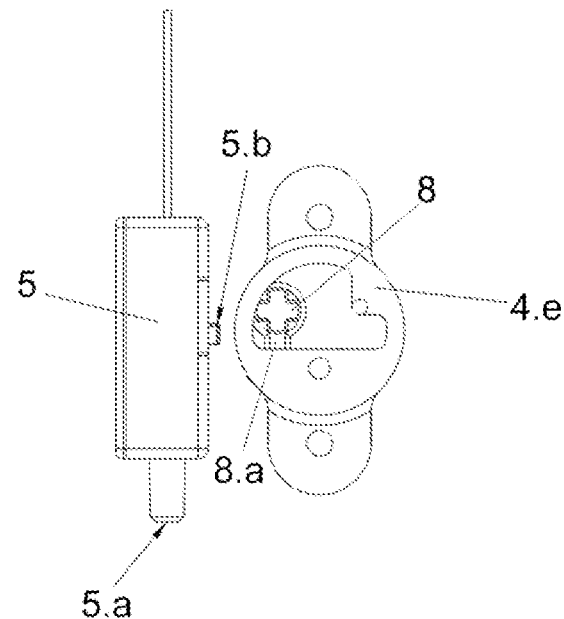
Figure 15:
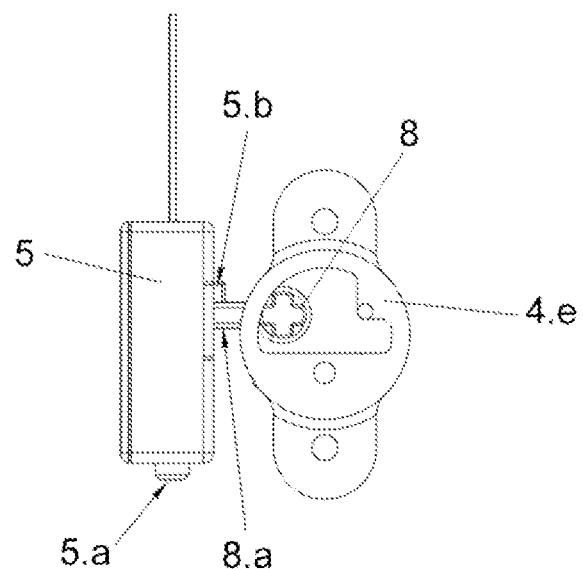

Locking and unlocking occur only when the push button (4) reaches the end of its travel; to this end, the tab (3) comprises a tab stop (3.e) which at the end of travel acts on a sensor (7.a) of the control circuit (7), detecting when the tab (3) has reached the end of its travel (FIGS. 11 and 12). In this way, the control circuit (7) knows when the tab (3) is in the closed or open position, indicating that the closing or opening has been carried out correctly, and detecting whether the locking or unlocking has occurred correctly.

The generating motor (6.*a*) produces a greater amount of power than that required to carry out the closing/opening operations, so that the remaining power produced is used by the control circuit (7) to carry out other actions such as:

Saving the latest events and the closed or open status in its memory.

Providing a sound and/or light feedback signal to signal the different actions carried out in the system.

In addition, in the case of an access control system failure, the possibility of performing an emergency opening has been provided by means of an emergency manual actuation mechanism (8), provided inside the push button (4) and comprising a lever (8.*a*).

To this end, the push button (4) is configured in such a way that it can be cut, and after removing the antenna (4.*c*) it is possible to insert a screwdriver, whereby accessing the emergency manual actuation mechanism (8), which is positioned inside of the push button guide (4.*e*), and in correspondence with the locking device (5), so that the screwdriver rotates the lever (8.*a*), which actuates a stop (5.*b*) provided on the locking shaft (5.*a*) causing it to move back, thus releasing the tab (3). By means of the action of the spring (3.*c*), the tab (3) automatically moves back to its open position, being inserted into the casing (1).

For maintenance tasks such as updating the firmware of the access control system, reading all the events of the access control system, etc., more power is required than what is produced by pressing the push button (4) to perform opening and closing operations.

For this reason, the access control system comprises an external power supply system by means of contacts (2.*a*). With the external power supply connected, a maintenance device can be used to carry out event reading tasks, configuration and firmware updates, and providing a power supply to the control circuit (7) to perform an emergency opening.

The described configuration provides a mechatronic design that ensures a user-acceptable pressing force and, in turn, a particularly fast operating time both mechanically and electronically.

Given that the mechanical energy that each user generates depends on their own strength and changes depending on the user, it is essential to design the mechatronic part to work with the minimum movement speed possible for users with low strength.

It is also necessary to take into account the minimum mechanical movement time necessary to complete the operation, since users with greater strength will perform the action in less time.

The design of the system provides a very low consumption and a very fast operating time (it has been verified by experiment to be less than 0.5 s).

Figure 16:
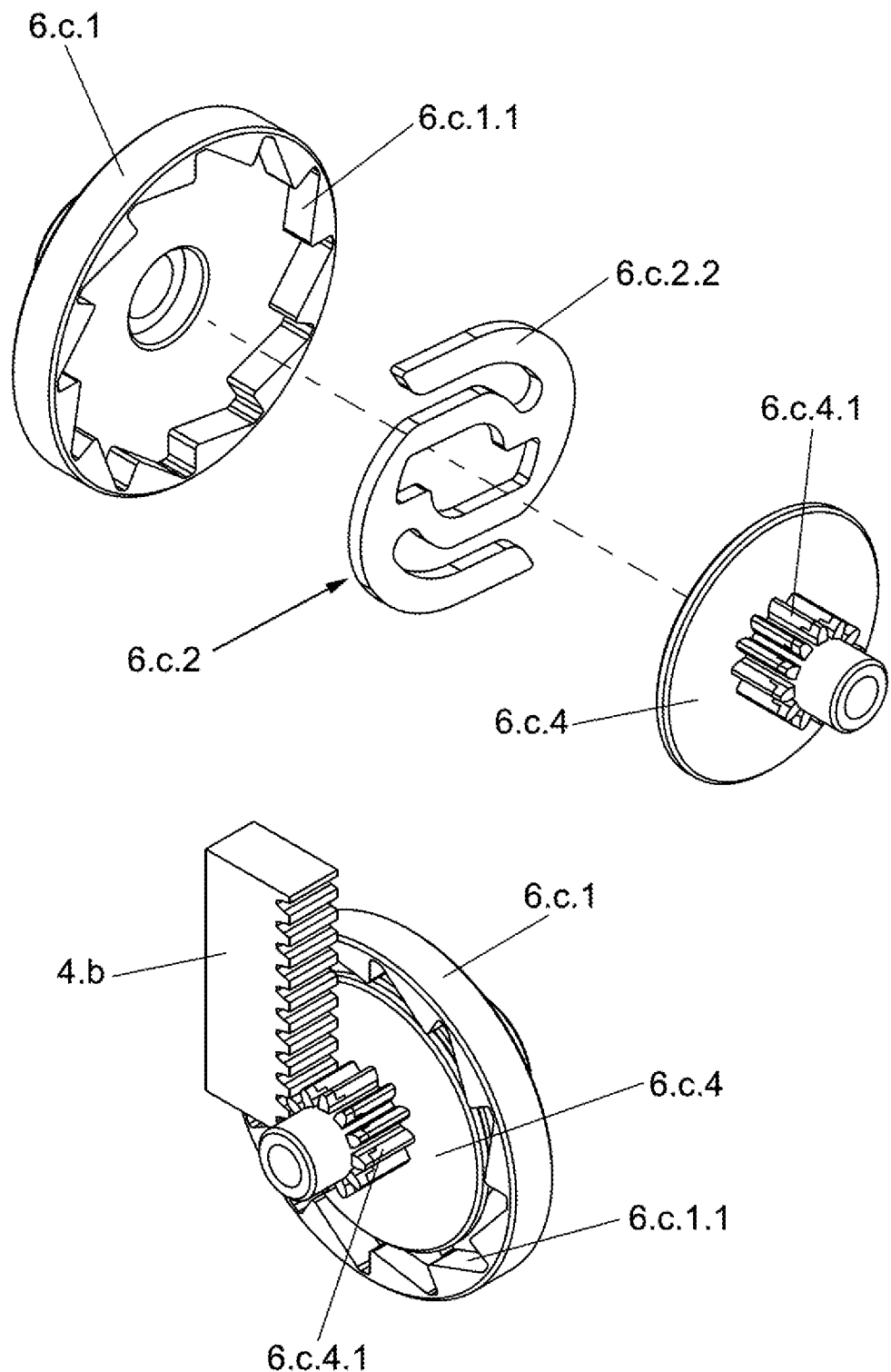
FIG. 16 shows different views of a second embodiment of the configuration of the clutch mechanism.
Figure 17:
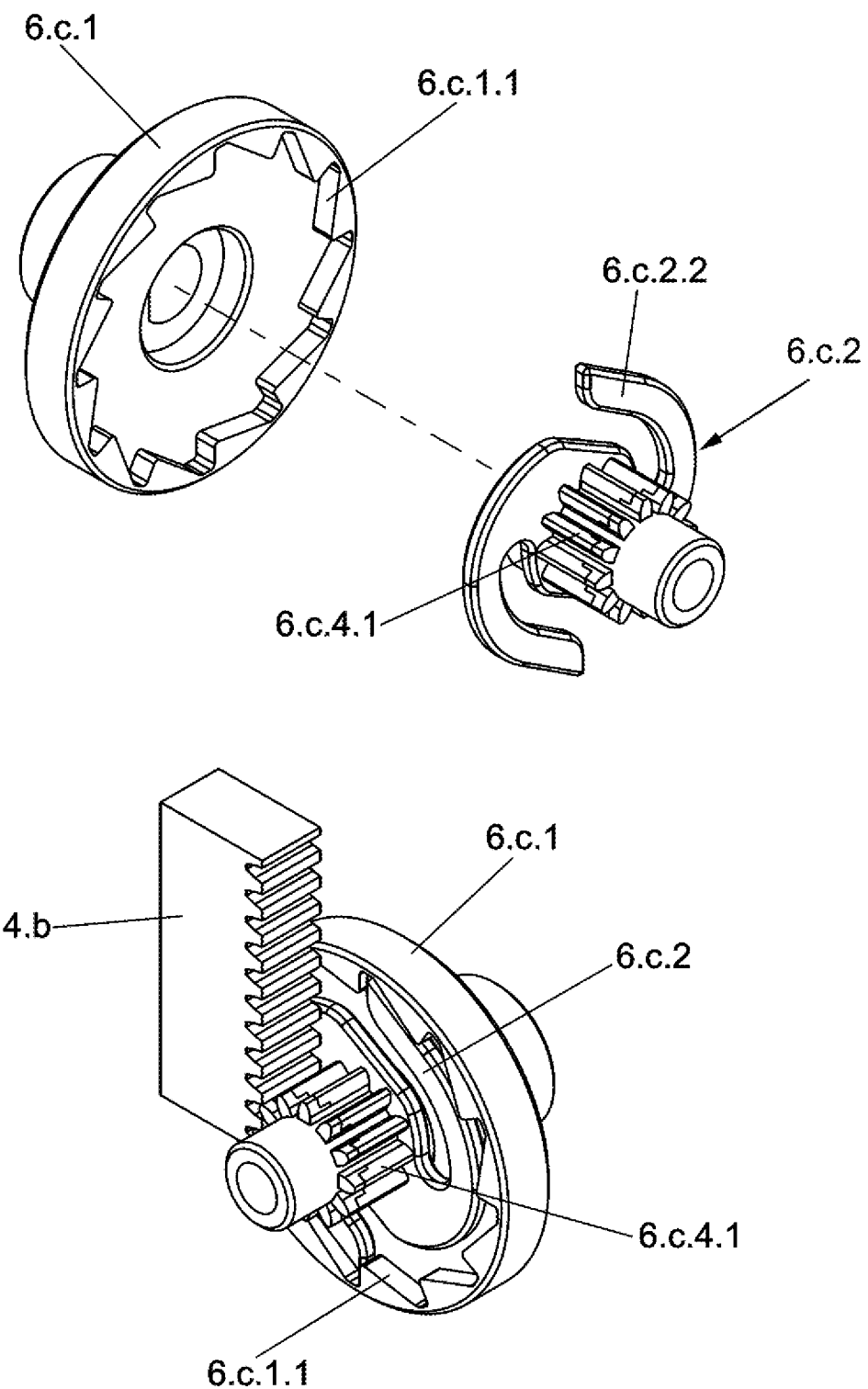
FIG. 17 shows different views of a third embodiment of the configuration of the clutch mechanism.

FIGS. 16 and 17 show two possible simplified embodiments of the clutch mechanism, which avoid the use of the ratchet arms (6.*c*.3) described above.

To this end, the pinion (6.*c*.4.1) of the mechanism in FIG. 16 is also integral with a body (6.*c*.4), but in this case said body (6.*c*.4) has been configured to retain a pushing element (6.*c*.2) that is equipped with flexible arms (6.*c*.2.2), which rest directly on the ratchet teeth (6.*c*.1.1) on the inner contour of the ratchet disc (6.*c*.1), so that the ends of the flexible arms engage the ratchet teeth (6.*c*.1.1) when the push button (4) is pressed, which determines that the pinion (6.*c*.4.1) transmits the circular movement to the generating motor (6.*a*). In contrast, during the movement in which the push button (4) recovers its distal position, the body (6.*c*.4) rotates in the direction opposite the pressing direction, in which situation the flexible arms (6.*c*.2.2) slide over the ratchet teeth (6.*c*.1.1) without engaging them, due to their sawtooth configuration, causing the ratchet disc (6.*c*.1) not to rotate, therefore no power is generated during this movement.

FIG. 17 shows another embodiment of the clutch mechanism in which the body (6.*c*.4) has been eliminated, so that the pushing element (6.*c*.2) with the flexible arms (6.*c*.2.2) is fixed directly to the pinion (6.*c*.4.1), providing the same operation as that described for FIG. 16.

The invention claimed is:

1. An access control system, comprising:
   a tab including at least a portion configured to move between an open position and a closed position, the closed position establishing closure of the access control system;
   a lock configured to lock the tab in the closed position upon actuation of the lock;
   a control circuit configured to control actuation of the lock;
   a motor configured to power the control circuit upon receipt of a mechanical force;
   an actuator moving between an unbiased position and a biased position; and
   a spring biasing the actuator to the unbiased position;
   wherein the actuator provides the mechanical force to the motor upon the actuator moving from the unbiased position to the biased position; and
   wherein the actuator does not provide the mechanical force to the motor upon the actuator moving from the biased position to the unbiased position.

2. The access control system of claim 1, wherein the actuator is further configured to move the tab between the open and closed positions.

3. The access control system of claim 1, wherein the tab comprises a tab return spring biasing the tab into the open position.

4. The access control system of claim 1, wherein the motor comprises a shaft with a pinion, and wherein the actuator comprises a rack, the rack configured to mesh with and rotate the pinion upon the manual actuation of the actuator.

5. The access control system of claim 1, wherein the actuator is configured to actuate in a first direction, and the tab is configured to move in a second direction orthogonal to the first direction.

6. The access control system of claim 5, wherein one of the actuator and the tab comprises a ramp, and the other of the actuator and the tab comprise a shaft, movement of the shaft along the ramp causing the tab to move in the second direction upon actuation of the actuator in the first direction.

7. The access control system of claim 1, wherein the tab comprises a housing and the lock comprises a shaft, actuation of the shaft of the lock into the housing locking the tab in the closed position.

8. The access control system of claim 7, wherein the control circuit causes actuation of the shaft into the housing upon receipt of power in the control circuit from the motor.

9. The access control system of claim 1, wherein the motor further comprises a clutch, the clutch configured to allow rotation of a portion of the motor upon actuation of the actuator in a first direction, and the clutch configured to prevent rotation of the portion of the motor upon movement of the actuator in a second direction opposite the first direction.

10. The access control system of claim 1, wherein the control circuit is further configured to carry out actions selected from saving the events occurring, together with the closed or open access status, in a memory; activating a sound device; activating a light device and a combination thereof.

11. The access control system of claim 1, comprising an emergency manual actuation mechanism for the closed position of the tab, wherein the emergency manual actuation mechanism is equipped with a lever, actuation of the lever configured to unlock the tab to the closed position.

12. The access control system of claim 1, wherein the control circuit further comprises contacts configured to be engaged by an external power supply, so that with the external power supply connected, a maintenance device can be used to perform event reading tasks, configuration and firmware updates, and to provide power to the control circuit in order to perform an emergency opening of the access control system.

13. An access control system, comprising:
a casing;
a tab including at least a portion configured to move between a closed position outside of the casing to establish closure of the access control system and an open position inside of the casing;
a lock including a locking portion configured to move into engagement with the tab to lock the tab in the first position upon actuation of the locking portion;
a control circuit configured to actuate the locking portion;
a motor configured to power to the control circuit upon receipt of a mechanical force; and
a push button movable between a first position and a second position;
wherein the push button provides the mechanical force to the motor upon the push button moving from the first position to the second position; and
wherein the push button does not provide the mechanical force to the motor upon the push button moving from the second position to the first position.

14. The access control system of claim 13, wherein the push button is further configured to move the tab between the open and closed positions.

15. The access control system of claim 13, wherein the tab comprises a tab return spring biasing the tab into the open position.

16. The access control system of claim 13, wherein the push button comprises an elastic element biasing the push button into the first position.

17. The access control system of claim 13, wherein the motor comprises a shaft with a pinion, and wherein the push button comprises a rack, the rack configured to mesh with and rotate the pinion upon the manual actuation of the push button.

18. The access control system of claim 13, wherein the push button is configured to actuate between the first and second positions in a first direction, and the tab is configured to move in a second direction orthogonal to the first direction.

19. The access control system of claim 18, wherein one of the push button and the tab comprises a ramp, and the other of the push button and the tab comprise a shaft, movement of the shaft along the ramp causing the tab to move in the second direction upon actuation of the push button in the first direction.

20. The access control system of claim 13, wherein the motor further comprises a clutch, the clutch configured to allow rotation of a portion of the motor upon actuation of the push button from the first position to the second position, and the clutch configured to prevent rotation of the portion of the motor upon movement of the push button from the second position to the first position.

21. The access control system of claim 13, wherein the control circuit is further configured to carry out actions selected from saving the events occurring, together with the closed or open access status, in a memory; activating a sound device; activating a light device and a combination thereof.

22. The access control system of claim 13, comprising an emergency manual actuation mechanism for the closed position of the tab, wherein the emergency manual actuation mechanism is equipped with a lever, actuation of the lever configured to unlock the tab to the closed position.

23. The access control system of claim 13, wherein the control circuit further comprises contacts configured to be engaged by an external power supply, so that with the external power supply connected, a maintenance device can be used to perform event reading tasks, configuration and firmware updates, and to provide power to the control circuit in order to perform an emergency opening of the access control system.

24. An access control system, comprising:
a control circuit,
a push button that can be moved from a distal position to a proximal position, which is aided by an elastic element to keep it in the distal open position of the system,
a tab, configured to be moved by means of the push button, and establish the closure of the access,
a locking device for locking the closed position of the tab,
an access identification element that communicates with the control circuit to lock/unlock the closed position of the tab when the control circuit identifies the access element, and
a power generator, comprising:
a rotating element configured to rotate when the push button is actuated,
a clutch mechanism; and
a power-generating motor to power the control circuit when the push button is actuated from the distal position to the proximal position, wherein the clutch is configured to transmit the rotating movement of the rotating element to the power-generating motor;
wherein the clutch mechanism comprises a body, which is integral with the rotating element, and in which there is retained in an articulated manner at least one ratchet arm that rests, by the action of a pushing element, on ratchet teeth provided on the inner contour of a ratchet disc which is coupled to a shaft of the power-generating motor to allow rotation of the motor when the push button is actuated from its distal position to its proximal position and to prevent its rotation when the push button returns to the distal position.

25. The system according to claim 24, wherein the tab comprises a housing of a locking shaft provided in the locking device to lock the tab in the closed position.

26. The system according to claim 25, wherein the tab is aided by a tab return spring that keeps the tab in the open position and opposes its movement to the closed position.

27. The system according to claim 24, wherein the push button comprises ramp guides arranged on tab shafts to allow guided movement of the tab.

28. The system according to claim 24, wherein the clutch mechanism comprises a body, which is integral with the rotating element, and in which there is retained a pushing element equipped with at least one flexible arm that rests on ratchet teeth provided on the inner contour of a ratchet disc which is coupled to a shaft of the power-generating motor to allow rotation of the motor when the push button is actuated from its distal position to its proximal position and to prevent its rotation when the push button returns to the distal position.

29. The system according to claim 24, wherein the rotating element is a pinion that meshes with a rack provided in the push button.

30. The system according to claim 24, wherein the control circuit is configured to carry out actions selected from saving the events occurring, together with the closed or open access status, in a memory; activating a sound device; activating a light device and a combination thereof.

31. The system according to claim 24, comprising an emergency manual actuation mechanism for the locked closed position of the tab, which is equipped with a lever the actuation of which causes the movement of the locking shaft of the locking device.

32. The system according to claim 31, wherein the push button is configured to allow its upper part to be broken, allowing access to the lever of the emergency manual actuation mechanism, and wherein said lever contacts a stop provided on the locking shaft when performing the emergency opening.

33. The system according to claim 24, wherein the control circuit comprises an external power supply device by means of contacts, so that with the external power supply connected, a maintenance device can be used to perform event reading tasks, configuration and firmware updates, and to provide power to the control circuit in order to perform an emergency opening.

* * * * *